Patented Jan. 18, 1927.

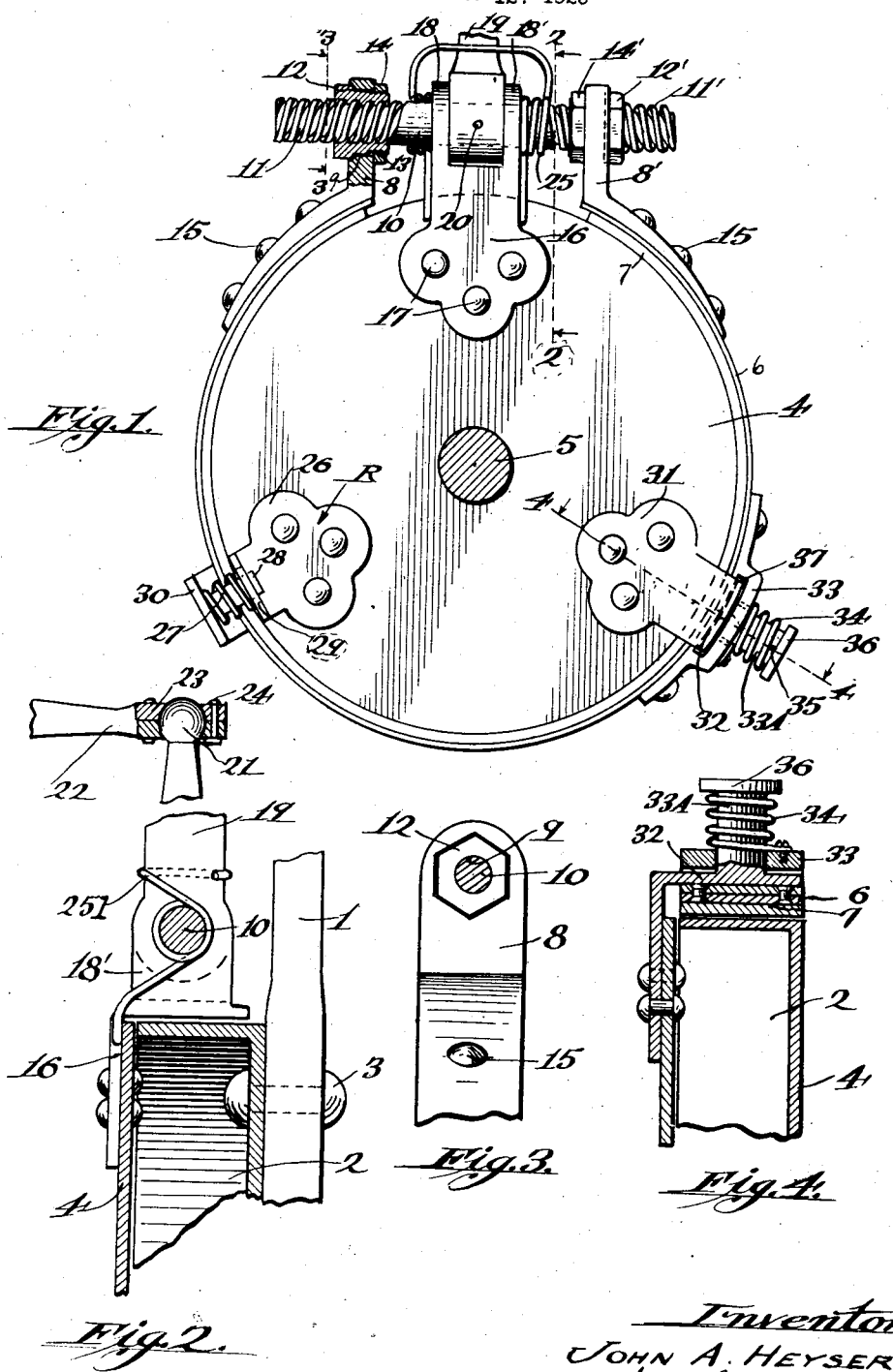

1,614,742

UNITED STATES PATENT OFFICE.

JOHN A. HEYSER, OF LOS ANGELES, CALIFORNIA, ASSIGNOR OF ONE-HALF TO VICTOR A. MACHRIS, OF LOS ANGELES, CALIFORNIA.

FRONT-WHEEL BRAKE.

Application filed October 12, 1923. Serial No. 668,053.

Although my present invention is referred to as a front wheel brake, it is an object of this invention to provide a brake mechanism especially suitable for use upon ground wheels which may be used in steering, such as the front wheels of an automobile of a usual construction, provided the same are associated with spindle elements, or their equivalents, expanded or built up sufficiently to provide for a brake drum, or the like, secured to said wheel.

It is an object of this invention to provide a simple and effective brake construction capable of use upon either front wheels or rear wheels but adapted to be operated by means of either a flexible or inflexible means extending directly or indirectly toward the center line of a vehicle frame; and, in a preferred embodiment of my invention, I may employ a brake band provided with substantially parallel projections or ears adapted to cooperate, as by means of apertures extending therethrough, with a threaded element capable of rotating in said apertures, this threaded element being provided with anchoring means which may extend to a dust plate or spindle plate and with actuating means which may comprise an arm secured by said anchor means and capable of movement in a direction substantially at right angles to the plane of a ground wheel to which my novel brake may be applied.

Other objects of my invention will appear from the following description of a preferred embodiment thereof, and from the appended claims, taken in connection with the accompanying drawings, in which:

Figure 1 is a vertical or elevational view, with parts broken away, showing, as from the inner side of a wheel, a preferred form of my front wheel brake.

Fig. 2 is a partial, vertical section on line 2—2 of Figure 1.

Fig. 3 is a partial, vertical section on line 3—3 of Figure 1.

Fig. 4 is a partial section on the diagonal line 4—4 of Figure 1.

Referring to the details of that specific embodiment of my invention which I have chosen for purposes of illustration, it may be understood that my novel brake is especially adapted for use on wheels, such as the front wheels of an automobile, provided with steering means; and 1, (Figure 2) may be regarded as the spoke of a wheel, to the inside of which is secured a brake drum 2, rivets or bolts 3 being conventionally employed to secure the latter in such manner as to compel its rotation with a front wheel, and 4 may be either an expanded plate integral with a spindle casting, or a dust plate, shown in Figure 1 as surrounding a spindle 5 and as providing points of support or anchorage for a brake of my preferred construction, this brake being shown as comprising an external brake band 6 having a lining 7, of asbestos or any preferred composition, and secured to or integral with the projections or brake ears 8, 8' extending in substantially parallel planes and preferably upward, and shown as provided with apertures 9, through which may extend a shaft 10, provided with means such as the external threads 11, 11', adapted to produce a relative movement between the respective upstanding ears 8, 8', as by engagement with the adjustable bearing blocks 12, 12', which may be provided with internal threads adapted to engage the external threads 11, 11' and also with an external thread as at 13. The nuts 12, 12' extend through the upstanding ears 8, 8' which are fastened to the ends of the brake band 6 as by rivets 15. On the outer faces of the ears 8, 8' there are formed hexagonal recesses or recesses which will snugly receive the outer ends of the nuts so as to hold them against rotation. The inner ends of the nuts are threaded and lock nuts 14, 14' are threaded thereon and are tightened against the inner faces of the ears. This construction provides for adjustment. On loosening the lock nuts 14, 14' the ears 8, 8' can be moved toward each other, so that the hexagonal ends of the nuts 12, 12' will no longer be within the recesses. These nuts can then be screwed either toward or away from the lever 19 on the shaft 10. When in the desired position the ears 8, 8' can be allowed to spring back so that the hexagonal ends of the nuts 12, 12' will again fit within the recesses. The lock nuts 14, 14' can then be tightened to hold the hexagonal ends of the nuts within the recesses and thus prevent the nuts 12, 12' from rotating. It will be readily appreciated that this construction permits tightening or loosening of the brake band about the drum, and as the nuts 12, 12' fit somewhat loosely within the ears 8, 8', they can move sufficiently to prevent any binding action upon the threads 11, 11' on tightening the band about the brake drum.

In order to employ the shaft 10 to contract or expand an external band brake of the character referred to, my invention requires that at least one end of the same shall be provided with threaded means for varying the distance between the respective ends of the brake band 6; and, in order to produce a rapid and reliable braking effect, I consider it advantageous to give the mentioned shaft the character of a turn-buckle, by providing the opposite ends thereof respectively with right and left threads, external threads being preferred, adapted to cooperate with similar threads within or upon the respective brake band ears 8, 8', any preferred anchoring and rotating means being operatively associated with the turn-buckle or operating shaft 10.

In order to retain a brake band of the character herein referred to in its intended relationship to a brake drum, and in order to provide bearings for the shaft 10, or its equivalent, I may provide means comprising an anchor plate 16, shown as secured by rivets 17 to the dust plate or spindle plate 2, this anchoring means being provided with a pair of bearing ears 18, 18', apertured to permit of a free rotation of the mentioned shaft therein and suitably spaced apart to receive and retain a brake arm or lever 19, shown as rigidly secured to the shaft 10 by means of a pin 20, and as thereby constituting an actuating means for my novel brake, this arm or lever 19 being optionally provided with a ball head 21, which may constitute a part of a universal joint by which operating means, such as a rod or lever or tension element 22, may be movably secured thereto, as by means of a plate 23 shown as secured by bolts 24, the construction herein referred to being such that a pull upon the tension element or rod 22, moving the upper end of the arm or lever 19 toward the center line of a motor vehicle, or the like, and thereby rotating the shaft 10, shall produce a corresponding diminution of the distance between the brake band ears 8, 8', thereby applying the brake band 6 effectively to the brake drum. A return of the parts to their normal or non-braking position may be effected either by an opposite movement imparted to the brake arm 19 by the means referred to, or by means of a U-shaped spring 25, shown in Fig. 1, having its ends coiled about shaft 10 and engaging the arm 19 tending to move the same into brake releasing position, or by a spring 25¹, shown in Fig. 2, coiled about the shaft 10 and engaging respectively the arm 19 and the dust or spindle plate 2. This movement of release is optionally assisted by means such as band retractors of any known or preferred design, the retractor shown at R in Figure 1 consisting essentially of a plate 26, secured to the dust or spindle plate 2, constituting a stop for the compression spring 27, shown as surrounding a pin 28, extending through an opening 29 in said stop and secured to or integral with a plate 30, mounted upon the brake band 6 and constituting a second or complemental stop for the spring 27.

Any equivalent band retracting means may obviously be substituted for the retracting means above described; and I may optionally employ, instead of or in addition to the means described, a retracting means associated with suitable means to prevent an undesired longitudinal movement of my brake band, when the same is frictionally engaged to produce a braking effect, one suitable construction for this purpose comprising a torque plate 31, shown as secured to the dust or spindle plate 2, this torque plate being provided with a tongue 32, shown as extending through a slotted positioning element 33, secured to the brake band 6, and as provided with a pin or radial extension 33ª extending through a suitable aperture in said slotted plate and surrounded by a tension spring 34, whose outer end may extend through and be retained by an aperture 35, shown as adjacent a head 36 on the outer end of said pin; the construction here referred to being such that the band 6 is retained against any extensive longitudinal movement by the engagement of the slot 37 with the tongue 32, and such that the said band is normally drawn outward, when released, by the action of the spring 34, it being obvious that any equivalent construction might be substituted for that just described and obvious, also, that band-retracting devices and torque-resisting devices may be employed in any desired numbers and in any suitable positions, in connection with the operating and relatively movable elements of my novel brake.

Although the arm or lever 19 may be positively moved in either direction by any suitable means, such as a usual longitudinal brake rod connected by, for example, a bell crank lever connected with a usual emergency brake lever and with a transversely moving rod 22, it will be obvious that I might alternatively employ, promptly and effectively to apply my brake, any known or preferred alternative operating means such as a compressed air device or other preferred means for the generation or application of power.

Although I have herein described but one complete embodiment of my invention, it will be understood that various features thereof might be independently employed, and also that various modifications might be made therein without departure from the spirit and scope of my invention, as the same is indicated above and in the following claims.

What I claim is:

1. A brake construction comprising a brake drum adapted to be secured to a wheel, a supporting plate adapted to be secured to a rigid element, a brake band, ears extending from the ends of the brake band, a shaft mounted through the ears with right and left threads, an anchor plate secured to the supporting plate and having a pair of bearing ears in which the center of the shaft is mounted, the bearing ears being between the brake band ears, a brake arm mounted upon the shaft between the bearing ears and fixed to the shaft, and a spring coiled about the shaft and engaging the brake arm and the supporting plate to operate the brake arm one way.

2. A brake construction comprising a brake drum, a brake band disposed about said drum, means for preventing rotation of said band with said drum, nuts adjustably mounted upon the ends of the band, a shaft having right and left threads connecting said nuts, and a brake arm rigidly secured to the shaft between said nuts.

3. A brake construction comprising a brake drum, a band disposed about said drum, means for preventing rotation of said band with said drum, ears upon the ends of the band, a shaft having right and left hand threads extending through the ears, nuts threaded onto the shaft and extending through the ears, lock nuts threaded onto the nuts, means for preventing rotation of the nuts when the lock nuts are tightened against the ears, and means for rotating said shaft.

4. A brake construction comprising a brake drum, a brake band disposed about said drum, means for preventing rotation of said band with said drum, ears upon the ends of the band, there being recesses formed on the outer faces of the ears, nuts extending through the ears having portions fitting within the recesses to hold them against rotation, a shaft having right and left hand threads extending through the nuts, lock nuts threaded onto the inner ends of the nuts adapted to be tightened against the inner faces of the ears, and means for rotating said shaft.

5. A brake construction comprising a brake drum, a band disposed about said drum, means for preventing rotation of said band with said drum, a rotatable shaft having one end connected to one end of the band, an ear on the other end of the band through which the shaft extends, a nut extending through the ear and threaded onto the shaft, there being a recess formed on the ear adapted to receive a portion of the nut to hold it against rotation, a lock nut threaded onto the nut adapted to be tightened against the ear to maintain the mentioned portion of the nut within the recess, and means for rotating said shaft to tighten or loosen the band about the drum.

In testimony whereof I have signed my name to this specification.

JOHN A. HEYSER.